United States Patent [19]
Golden

[11] 3,961,181
[45] June 1, 1976

[54] EYE-SHADING MEANS FOR AUTOMOTIVE VEHICLE OPERATORS

[76] Inventor: Eddie R. Golden, 12812 Erwin St., North Hollywood, Calif. 91606

[22] Filed: Feb. 18, 1975

[21] Appl. No.: 550,213

[52] U.S. Cl. .................... 250/208; 250/215; 250/229; 250/237 R; 250/578; 350/160 LC; 350/276 R
[51] Int. Cl.² ..................... G02F 1/13; H01J 39/12
[58] Field of Search ............... 250/215, 237 R, 200, 250/208, 209, 204, 216, 225, 229, 578; 350/160 LC, 276 R; 315/77, 149, 153, 154

[56] References Cited
UNITED STATES PATENTS

| | | | |
|---|---|---|---|
| 3,198,953 | 8/1965 | Peters | 250/237 |
| 3,614,210 | 10/1971 | Caplan | 350/160 LC X |
| 3,705,310 | 12/1972 | Wild | 250/229 |
| 3,885,152 | 5/1975 | Anetseder et al. | 250/215 X |

*Primary Examiner*—Eugene La Roche
*Attorney, Agent, or Firm*—Clarence M. Crews

[57] ABSTRACT

An eye shade is provided for vehicle drivers which separately but simultaneously shields the two eyes of the driver against the blinding glare of direct sunlight in the daytime or of approaching vehicle headlights at night, while leaving the space between and outside the shielded zones clear. The eye shade desirably consists primarily of a laterally extending series of contiguous substantially vertically disposed, electrically darkenable cells or zones such as liquid crystals, each of which cells or zones has the characteristic that it is transparent when no voltage is applied to it, but that it becomes progressively opaque with increase of applied voltage. The applied voltage is controlled by a laterally extending array of contiguous photosensitive sensor cells, each characterized by the fact that its electrical resistance increases as intensity of light exposure diminishes. The sensor cells are individually cross-associated electrically with several electrically darkenable, liquid crystal cells or zones of the eye shield. In one embodiment, pairs of electrically darkenable cells or zones are rendered opaque by the shielding of their associated sensors against exposure to sunlight or to approaching headlights. Alternatively, spaced pairs of electrically darkenable cells or zones may be rendered temporarily opaque by the exposure of their associated sensor cells to light. In the first instance the associated sensor cell and light darkenable eye-shading zone are connected electrically in parallel; in the other instance, which is preferred, they are connected in series.

8 Claims, 12 Drawing Figures

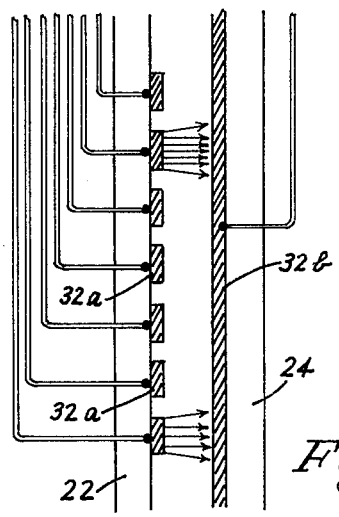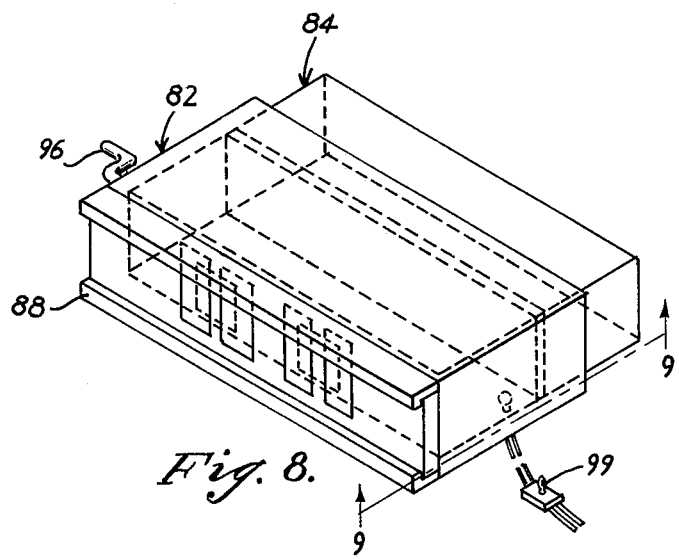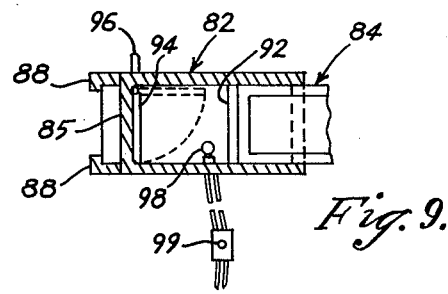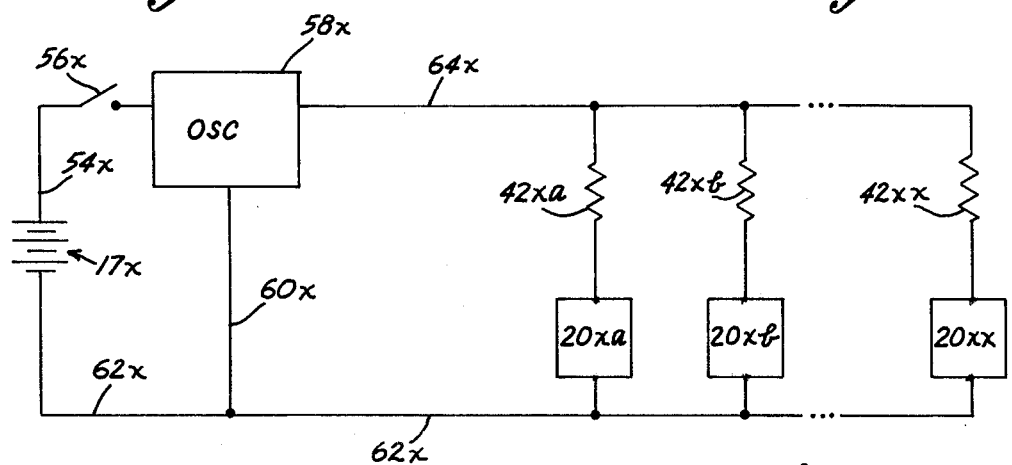

EYE-SHADING MEANS FOR AUTOMOTIVE VEHICLE OPERATORS

This invention relates to means for individually but simultaneously shading the eyes of a vehicle driver against the blinding direct glare of the sun in daytime, or of approaching vehicle headlights in nighttime, while leaving substantially the entire remainder of the normal field of view clear.

To this end it is a feature that a continuous, normally transparent, eye-shading screen is provided adjacent to the inner side of a vehicle windwhield which may be maintained in a raised, inactive position or may be swung down into the line of vision of the vehicle operator as required, like the conventional sun visor now universally provided. Unlike the sun visor, however, the driver looks through the eye-shading screen.

Unlike the conventional visor, my novel screen is composed of normally transparent contiguous liquid crystal cells or zones, each broad enough to cover a selected measure of arc, for example, about a half degree or more of arc of the driver's vision and each adapted to be darkened to a desired degree when impressed with an appropriate electrical potential.

It is a feature of the invention that for controlling the light conductivity of the individual liquid crystals a linear array of laterally extending contiguous, photosensitive sensor cells is provided on the cowl of the vehicle, or in any other suitable location, such as on the roof of the vehicle, in conjunction with light screening means. In a non-preferred form a pair of posts is suitably placed for shading spaced members of the sensor cell array.

Instead of employing a pair of spaced posts for selectively shading the photosensitive sensor members, a shield is preferably provided with two appropriately spaced gaps for permitting rays of the sun, or of approaching headlights, directly to reach only appropriately spaced sensor cells. With this varied, and preferred, arrangement the electrical arrangement of associated sensor and eye shading units would be varied to cause eye-shading to be effected by the sensor cells illuminated through the gaps in the solid shield.

If the array of sensor cells is on the same scale as the eye shade, the posts or slots, as the case may be, will desirably be spaced apart by substantially the distance between the retinas of a driver's eyes and at a distance from the array of photosensitive cells equal substantially to the distance from the screen to the driver's eyes.

The fact that different drivers have different eye spacings can be accommodated by slightly increasing the widths of the shaded area beyond the minimum which would be required if the eyes of all drivers were equally spaced.

The array of photosensitive sensor cells may, however, be on a considerably smaller scale than the eye-shading screen of liquid crystals, in which case the spacing of the shielding means from one another and from the array of photosensitive sensor cells would be proportionately reduced.

In either the preferred or non-preferred situation, the individual photosensitive sensor cells are cross-associated electrically with the respective electrically darkenable liquid crystal zones of the eye-shading screen, the sensor cell at the extreme right, for example, being electrically associated with the zone of the eye shade at the extreme left, and vice versa.

The angular relation of the sun may be such that pairs of adjacent eye shade zones are differentiated from the others as to shading simultaneously, in which case, according to the preferred arrangement, two pairs of adjacent crystal zones may black out or dim the sun simultaneously. In such a situation two strips, each covering substantially one degree or more of the driver's vision, will be temporarily darkened.

In a modified and preferred embodiment of the invention, the use of the sensor is exactly reversed, two suitably spaced sensor members being normally exposed to sunlight or to headlights and the remainder being shaded. The electrical control of liquid crystals by individual sensors is so modified, however, that the eye shield functions in essentially the same manner as before.

The latter arrangement is especially preferred because it is better adapted for screening against the blinding effect of high beam headlights when driving at night.

In order to make the device respond in substantially the same manner to the sun and to approaching headlights, a dimming shield may be provided in association with the sensor array, which shield is foldable between an active daylight condition and an inactive nighttime condition.

Other objects and advantages will hereinafter appear.

In the drawing forming part of this specification,

FIG. 7 is a fragmentary plan view of a portion of the eye shade, the view showing electric vectors of two spaced, active zones, and the horizontal dimension being greatly exaggerated relative to the vertical dimension;

FIG. 8 is a perspective view of a preferred form of sensor and of sensor shading means;

FIG. 9 is a view in side elevation of the device of FIG. 8;

FIG. 10 is a view in elevation of the front wall of the sensor shading means of FIG. 8;

FIG. 11 is a sectional view taken on the line 11—11 of FIG. 10, looking in the direction of the arrows; and FIG. 12 is a diagram which shows how the sensor components of FIGS. 8 to 11, inclusive, are electrically associated with the oscillator and the eye shade.

Figure 1:
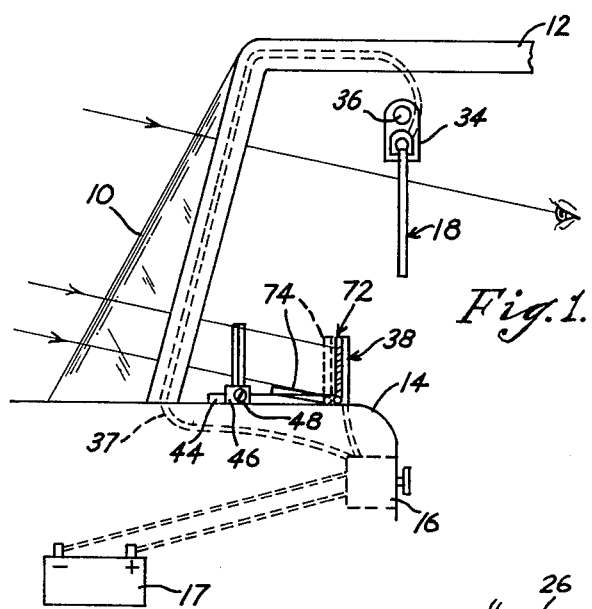
FIG. 1 is a fragmentary, largely diagrammatic view in side elevation showing a battery, the windshield, and portions of the roof and cowl of an illustrative vehicle together with principal elements of one form of my novel light screening system.

In FIG. 1 there are outlined conventional portions of an automotive vehicle including the windshield 10, a portion of the roof 12, the cowl 14, a portion of the dashboard 16, and the battery 17.

A practical and advantageous, but non-preferred, form of the invention will be first described since that will afford a basis for comparison when describing the preferred form, and explaining why the latter form is preferred.

In accordance with a practical and advantageous, but non-preferred, form of the invention, an eye shade or shield 18 is provided consisting of an uninterrupted linear array of adjacent liquid crystal cells 20, each broad enough, at least, to block out a half a degree of arc of the driver's vision, and preferably somewhat more, so that the complete sun disc can be shaded or dimmed for each eye by a single cell, even though the driver moves or turns his head a bit.

The eye shade 18 is desirably composed of adjacent liquid crystal cells 20. It consists of front and rear sheets of glass 22 and 24, and continuous top and bottom sheets of glass 26 and 28. The inner face of sheet 22 is continuously coated for each cell 20 with a layer 32a of tin oxide, which is both conductive and transparent. The space between sheets 22 and 24 is filled with a chemical such as anisilidene-p-aminophenylacetate. The inner face of sheet 24 has a continuous coating 32b of tin oxide over its entire surface.

The nature of each liquid crystal cell or zone is such that when no voltage is applied across the space between the tin oxide conductor coatings 32a and the coating 32b of the cell, the cell is transparent, but when an oscillating voltage is applied, incident light will be scattered. As the voltage increases, fewer direct rays from the sun reach the eye of the driver. When sufficient voltage is applied the sun's disc is greatly attenuated, and the cell appears as a low intensity, diffuse light source. Most of the time the shading effect applies to two adjacent cells, and when the shading effect is most concentrated on a single cell the adjacent cells are shaded to a lesser degree as suggested by the arrows of FIG. 7.

The eye shade 18 is carried by a bracket 34 which is mounted on a tube 36. The bracket 34 is rotatively mounted so that the eye shade, when it is not needed, can be turned from an active vertical position to an idle horizontal position adjacent the roof, and retained there like a conventional solid visor. The bracket 34 serves also to house a multiplicity of conductors 37 which run to the individual cells 20 as will be fully explained later.

On the cowl, or in any other practical location, there is mounted a linear array 38 of sensor cells 42. There is one sensor cell 42 for each liquid crystal cell or zone 20. Extending forward on the cowl from the sensor cell array is a channeled guideway 44. A transversely extending bar 46, disposed at right angles to the guideway 44, is slidably adjustable fore-an-aft on the guideway 44. The bar 46 may be fixed in any selected position along the guideway 44 by a set screw 48.

The bar 46 has one or two channels for receiving and retaining the bases of two upstanding posts 50a,50a, and two upstanding posts 50b,50b, each of which pairs is adjustable along the guideway of 46 and may be fixed in any position desired along the bar. The posts 50a would always form a single shadow and the posts 50b would always form a single shadow. Each post is desirably at least wide enough to shade one of the sensor cells 42. As shown, the posts 50a are slighly disaligned to shade one or two sensor cells 42, and the posts 50b are slightly disaligned to shade one or two sensor cells 42.

Adjacent portions of the posts desirably lie in a common vertical plane and in that plane the distal boundaries of the posts terminate in sharp edges, so that the width of shading is not varied by the variable lateral angle of the sun. This is a desirable, but not an essential, detail.

Figure 5:
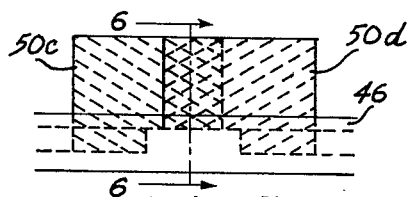
FIG. 5 is a view in elevation of a form of sensor shading means in which relatively adjustable overlapped sheets of opaque material are employed for sensor shading.
Figure 6:
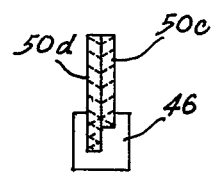
FIG. 6 is a sectional view of the sensor shading means of FIG. 5, the section being taken on the line 6—6 of FIG. 5, looking in the direction of the arrows.

An alternative means of shading is illustrated in FIGS. 5 and 6 in which two pairs of opaque sheets 50c, 50d are mounted in overlapped relation on the bar 46.

The individual sensor cells 42 are cross-associated electrically with individual liquid crystal cells 20 of the eye shield, the rightmost sensor cell being associated with the leftmost liquid crystal cell and the leftmost sensor cell being associated with the rightmost liquid crystal cell. It follows that when the shadow of 50a falls upon sensor cell or cells 42a, the liquid crystal cell or cells 20a will be rendered opaque and its or their shadows will fall on the left eye of the driver, and at the same time the shadow of post 50b will fall on sensor cell or cells 42b, causing cell or cells 20b to be rendered opaque, and its or their shadows to fall on the right eye of the driver.

As the sun shifts laterally the shading shifts laterally, so that direct sunlight is always blotted out or dimmed for the left and right eyes individually.

The fact is not lost sight of that a single post 50 can simultaneously partially shade two sensor cells but two adjacent sensors can only render two adjacent liquid crystals relatively opaque so that the shaded area for each eye needs never substantially exceed one degree of arc. A degree and a half of shading or even more would do no harm.

Figure 4:
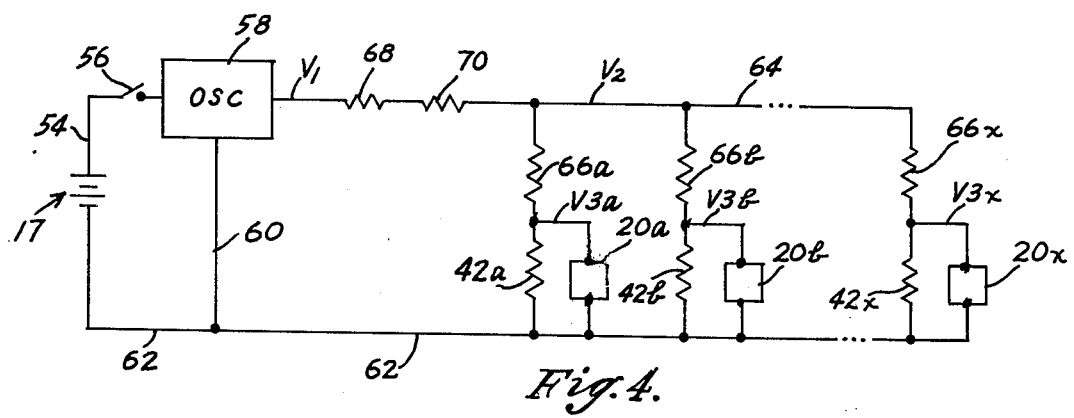
FIG. 4 is a diagram which shows how the components of FIGS. 1 to 3 are connected electrically.

The character of the electrical circuitry for the arrangement thus far described is shown in FIG. 4.

The vehicle battery 17 is connected through a conductor 54, and a switch 56, to an oscillator 58 having a return line through conductors 60 and 62 to the battery 17. The oscillator includes a potentiometer, not shown, for adjusting its output. A comparatively high voltage output circuit of the oscillator comprises main conductors 60 and 64.

Each liquid crystal cell 20a, 20b etc. is connected in parallel with a sensor cell 42a, 42b, etc., and each of these parallel combinations is connected in series with a fixed resistor 66a, 66b, etc. Each sensor cell 42 is made of a material such as cadmium sulfide so that its resistance when exposed to sunlight is about one per cent of its resistance when fully shaded. If the maximum resistance of the sensor cell 42a is equal to the fixed resistance of 66a, then the voltage at V3a will be equal to one-half the voltage at V2 when the sensor cell is shaded. The voltages at V3a, V3b, etc. will be approximately one per cent of the voltage at V2 when the sensor cell 42 is in sunlight.

A liquid crystal cell 20 will draw relatively little current when the associated sensor cell is in sunlight because the impedance of the crystal cell is then much greater than that of the associated sensor cell. If the maximum voltage at V2 is about forty volts, then the voltage at V3a, V3b, etc. can vary from 20 volts to 0.4 volts, causing the liquid crystal cell to be opaque and transparent, respectively.

If the voltage at V2 were obtained directly from the oscillator 58, then all liquid crystal cells 20 might become opaque at the same time when the sun disappears behind a building or an adjacent vehicle. To prevent this a pair of guard sensor cells 68 and 70, like the cell 42, are connected in series between the oscillator 58 and the V2 bus.

When both guard sensor cells 68 and 70 are in the sun, their combined resistance is low. Hence the voltage at V2 nearly equals the voltage at V1. When, however, either guard sensor cells 68 or 70 is shaded, its resistance is nearly equal to that of any fixed resistor 66a, 66b, etc., so that the voltage at V2 is equal to twice the voltage at V1 divided by the number of sensors. The voltage at V2 will then be so low that all liquid crystal cells 20 will remain transparent.

The guard sensor cells 68 and 70 are much wider than the sensor cells 42, so that shadows from the posts will not significantly increase their resistances.

A polarized filter 72 may be placed in front of the sensor array 38 to minimize the effect of reflected sunlight. Reflective surfaces ahead of the vehicle and to the right or left of the sun may reflect light, momentarily at least, to those sensor cells 42 which are shaded from direct sunlight by the posts, tending to keep the resistance of those sensors lower than it should be.

If the lateral angle between the incident rays of the sun and the reflecting surface is large, little light can be troublesomely reflected. As the lateral angle decreases, however, the amount of troublesome reflected light increases, approaching one hundred per cent at zero degrees. The reflected light which has its E vector perpendicular to the plane of incidence is much greater than that which is parallel to the plane of incidence for intermediate angles. The polarized filter will therefore be oriented to attenuate the perpendicularly polarized light.

A neutral density filter 74 may be flipped up in front of the polarized filter to attenuate the sun's rays for daylight operation. The neutral density filter 74 would be flipped down at night, as shown in FIG. 1, to avoid attenuating oncoming headlights.

As has been noted, the posts 50a and 50b can be adjusted fore-and-aft by adjustment of bar 46 along bar 44, and the overlapping of posts 50a,50a, and of posts 50b,50b can be adjusted by individual lateral adjustment of them along the bar 46. Most desirably the adjacent faces of posts 50a,50a and of posts 50b,50b lie in a common transverse plane, and each such combination 50a,50a and 50b, 50b desirably has right and left hand boundaries which are razor thin in the common plane. By virtue of this relationship the adjusted width of shading of the sensor array is held uniform for all visible, lateral angles of the sun.

The system thus far described is one in which all sensor cells are exposed to direct sunlight except those which are shaded by the composite posts 50a, 50a and 50b, 50b. A generally similar but preferred alternative system is disclosed in FIGS. 8 to 11, inclusive.

In this latter system the individual sensor cells 42, the sensor array 38, the liquid crystals 20 and the sun shade 18 formed by the liquid crystals may all be as hereinbefore described.

The sensor shielding means is varied, however, to shield all but the sensors which were previously described as exposed to sunlight and to expose to sunlight the sensors which were previously described as selectively shaded. This requires that the paired sensors and liquid crystals be electrically associated, not in parallel relation but in series relation with one another. The alternative arrangement is illustrated in FIGS. 8, 9, 10, 11 and 12.

In FIG. 8, the eye shade is not shown because it may be in the form already described. As before, the eye shade is pivotally mounted so that it can be swung down to an active vertical position or up out of the way against the roof of the vehicle body.

The sensor cell array is desirably situated as before on the cowl of the vehicle.

A rigid box frame 82, open at the rear end, is mounted on the cowl. It slidingly receives a snugly fitting box frame 84, which may also be open at the rear end. The box frame 82 is desirably affixed directly to the cowl of the vehicle.

The front wall 85 of the box frame 82 includes large openings 86 (FIG. 10) for the admission of light, and it includes forwardly located, opposed, horizontal channeled portions 88 for receiving and adjustably supporting four light shielding members 90. The light shielding members 90 are paired, the members of each pair being adjustable to provide a light slot 91 of desired width in a desired location between them.

The box frame 84 carries upon its front wall a sensor array 92, like the sensor array 38 already described. A neutral density filter 94 pivotally mounted in the upper, forward corner of the box-like member and desirably made to cover the entire inner face of box wall 85, is operable by a crank 96 between the lower, light shielding position illustrated in full lines in FIG. 9 and the upper, inactive position illustrated in broken lines in that figure.

The filter is normally placed in the lower, active position in the daytime and in the upper, inactive position at night. This filter is provided because the sensors must be sensitive enough to act effectively for dimming bright headlights at night and that degree of sensitivity is not required for producing the effective shielding of sunlight.

An electric light bulb 98, controlled by a switch 99, may be mounted inside the forward end of the box-like member 82 for dimly illuminating all of the sensors in the daytime and thereby causing all the eye shade cells to effect a limited amount of shading.

The circuitry of the system disclosed in FIGS. 8 to 11, inclusive, is illustrated in FIG. 12.

It is generally similar to the circuitry of FIG. 4. The same reference characters have been applied to corresponding parts, with the letter "x" added in each instance so that a general detailed description is unnecessary.

It should be noted, however, that the guard sensors 68 and 70 of FIG. 4 are omitted as unnecessary and that the sensors exemplified by 42xa, 42xb and 42xx are connected in series, respectively, with 20xa, 20xb and 20xx, not in parallel. This altered relationship of sensors to liquid crystal cells is maintained throughout in the preferred system of FIGS. 9 to 12.

Figure 2:
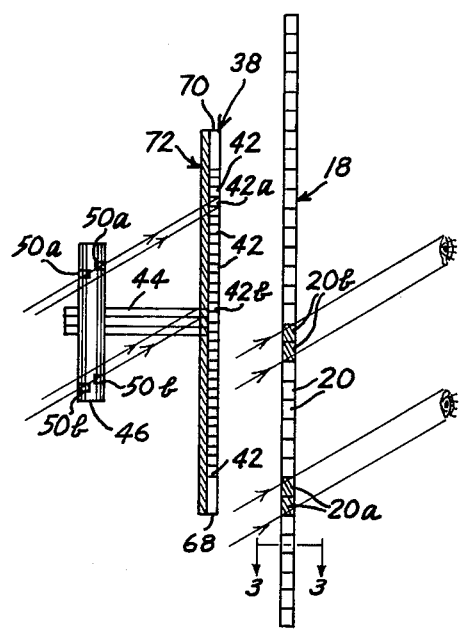
FIG. 2 is a plan view showing only the principal parts of my novel system of FIG. 1, and illustrating clearly how sensors may be differentially shaded and may thereby be utilized to shade the driver's eyes.
Figure 3:
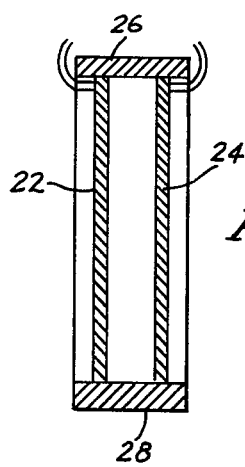
FIG. 3 is a view in sectional elevation on a much larger scale than FIGS. 1 and 2, showing the structure of a typical liquid crystal zone.

The reason why the guard sensor cells 68 and 70 of FIGS. 2 and 4 are not required in the system of FIGS. 9 to 12 is that under this system only the unshielded sensor cells cause the associated eye shade cells to dim or suppress the light. Should the vehicle pass into the shadow of a building or other structure during daytime driving, therefore, causing all the sensors to be shaded, the effect would be, not to cause additional eye shade cells to become light obstructing, but to enable the cells which were light obstructing to become light transmitting until the vehicle again emerges into the sunlight.

I have described what I believe to be the best embodiment of my inventon. What I desire to cover by letters patent, however, is set forth in the appended claims.

I claim:

1. A structure for individually but simultaneously shading the eyes of a vehicle driver against the blinding effect of the sun and of approaching vehicle headlights, consisting of
    a. a linear eye-shading screen composed of a series of contiguous, normally transparent but electrically darkenable zones adapted to be situated between the driver's eyes and the sun, each such zone being wide enough when darkened, effectively to obviate the glaring effect of the sun upon one eye of the driver,
    b. a linear array of contiguous photosensitive sensor cells equal in number to the number of electrically darkenable zones of the eye-shading screen and disposed physically in parallelism with the eye-shading screen and in positions in which they may be exposed to the sun and to approaching headlights,
    c. sensor shielding means located in front of the array of sensor cells in position selectively to differentiate uniformly spaced sensor cells and uniformly spaced pairs of adjacent sensor cells from the remainder of the sensor cells as to shading, and
    d. electrical control means electrically cross-associating individual sensor cells of the sensor cell array and individual electrically darkenable zones of the eye-shading screen in such manner that the differentiated electrically darkenable zones of the eye-shading screen will be selectively darkened to shade the respective eyes of the driver.

2. A structure for individually but simultaneously shading the eyes of a vehicle driver as set forth in claim 1 in which the mounting means is provided for the eye-shading screen constructed and arranged to enable the screen to be shifted between an active position and an inactive, out-of-the-way position.

3. A structure for individually but simultaneously shading the eyes of a vehicle driver as set forth in claim 1, in which provision is made of means for adjusting the sensor shielding means fore-and-aft to accommodate the eye-shading effect of the eye-shading screen to the distance between the eye-shading screen and the eyes of the driver.

4. A structure for individually but simultaneously shading the eyes of a vehicle driver as set forth in claim 1 in which all sensor cells are of the same width and all eye-shading zones are of the same width.

5. A structure for individually but simultaneously shading the eyes of a vehicle driver as set forth in claim 1 in which the sensor cells are all of uniformly reduced width as compared to the uniform width of eye-shading zones, the distance of the sensor shielding means from the sensors is proportionately reduced as compared to the distance of the driver's eyes from the eye-shading screen, and the sensor shielding means disposed in front of the array of sensor cells is proportionately reduced in its lateral spacing and lateral dimensions.

6. A structure for normally individually but simultaneously shading the eyes of a vehicle driver against the blinding effect of the sun and of approaching vehicle headlights as set forth in claim 1 which includes a vehicle carried battery, an oscillator connected to furnish electrical energy from the battery to normally high potential main electrical output conductors, branch circuits through which the main output conductors communicate electrically with one another in which branch circuits individual sensor cells are associated with individual electrically darkenable zones of the eye-shading screen, said oscillator being constructed and arranged normally automatically to increase radically the voltage applied to the individual electrically darkenable zones required to shade the eyes as compared with the voltage applied to the electrically darkenable zones not currently required to shade the eyes, and photosensitive means interposed in at least one of said main output conductors for radically reducing the potential applied to all such branch circuits when the vehicle is shaded from the sun by a building or other structure, thereby temporarily to render all the electrically darkenable zones of the eye-shading screen incapable of producing any eye-shading effect.

7. A structure for individually but simultaneously shading the eyes of a vehicle driver as set forth in claim 1 in which the sensor shielding means disposed in front of the sensor cells consists of a pair of upstanding spaced posts; and the electrical means through which individual sensors and individual electrically darkenable zones of the eye-shading screen are associated comprise the vehicle battery, an oscillator energized by the battery and a multiplicity of branch circuits conductively interposed between the oscillator output terminals, in each of which a sensor cell and an electrically darkenable zone are included in parallel relation.

8. A structure for individually but simultaneously shading the eyes of a vehicle driver as set forth in claim 1 in which the sensor shielding means disposed in front of the sensor cells consists of an opaque shield having spaced slots through which only selected, suitably spaced sensor cells are exposed to the direct light of the sun or of approaching headlights and in which electrical energy is furnished from a vehicle battery through an oscillator having opposed main output conductors, each paired associated sensor cell and electrically darkenable zone of the eye-shading screen being series connected in one of a multiplicity of parallel branch circuits between the oscillator terminals, the construction and arrangement being such that each sensor cell exposed to bright sunlight or bright headlights has its resistance radically reduced, thereby causing the associated zone of the eye-shading screen to draw relatively large current and as a consequence to become relatively opaque.

* * * * *